(12) United States Patent
Klausmeier et al.

(10) Patent No.: US 6,430,191 B1
(45) Date of Patent: Aug. 6, 2002

(54) MULTI-STAGE QUEUING DISCIPLINE

(75) Inventors: Daniel E. Klausmeier, Sunnyvale; Kevin Wong, San Jose; Quang Nguyen, San Jose; Cherng-Ren Sue, San Jose; David A. Hughes; Ross Suydam Heitkamp, both of Mountain View; Rafael Gomez, Cupertino, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/885,400

(22) Filed: Jun. 30, 1997

(51) Int. Cl.[7] ............................................. H04L 12/56
(52) U.S. Cl. ...................................... 370/412; 370/468
(58) Field of Search ................................ 370/412, 468, 370/414, 416, 418, 395, 397, 230, 235, 236

(56) References Cited

U.S. PATENT DOCUMENTS

| | | | |
|---|---|---|---|
| 4,430,712 A | | 2/1984 | Coulson et al. |
| 4,849,968 A | | 7/1989 | Turner |
| 5,014,265 A | | 5/1991 | Hahne et al. |
| 5,157,654 A | * | 10/1992 | Cisneros ..................... 370/414 |
| 5,274,768 A | | 12/1993 | Traw et al. |
| 5,303,078 A | * | 4/1994 | Brackett et al. ............ 359/139 |
| 5,311,509 A | | 5/1994 | Heddes et al. |
| 5,313,454 A | | 5/1994 | Bustini et al. |
| 5,359,592 A | | 10/1994 | Corbalis et al. .............. 370/17 |
| 5,379,297 A | * | 1/1995 | Glover et al. ................ 370/412 |
| 5,412,655 A | | 5/1995 | Yamada et al. |
| 5,434,848 A | | 7/1995 | Chimento, Jr. et al. |
| 5,469,433 A | | 11/1995 | McAuley |
| 5,499,238 A | | 3/1996 | Shon |
| 5,517,643 A | | 5/1996 | Davy |
| 5,530,698 A | | 6/1996 | Kozaki et al. |
| 5,539,899 A | | 7/1996 | Huynh et l. |
| 5,541,912 A | | 7/1996 | Choudhury et al. |

(List continued on next page.)

FOREIGN PATENT DOCUMENTS

EP          0706298          4/1996

OTHER PUBLICATIONS

Hashemi et al. "A General Purpose Cell Sequencer/Scheduler for ATM Switches" IEEE, 5/97, 29–37.*
Chao et al. "Design of Virtual Channel Queue in An ATM Terminal Adaptor" IEEE, 6/92, 294–302.*
Kenji Kawahara et al, "Performance Evaluation of Selective CellDiscard Schemes in ATM Networks," 1996 IEEE, pp. 1054–1061 (Mar. 24, 1996).
Voshihiro Ohba et al., "Dynamic Threshold Control for Shared Buffer ATM Switching," IEEE InfoCom '96, The Conference on Computer Communications, Mar. 24–28, 1996.

*Primary Examiner*—Chau Nguyen
*Assistant Examiner*—Jasper Kwoh
(74) *Attorney, Agent, or Firm*—Blakely, Sokoloff, Taylor & Zafman LLP

(57) ABSTRACT

In a digital switch, incoming cells are placed into a queue in a cell memory. The switch maintains various cell queues, including VC queues that correspond to individual connections and QBin queues that correspond to various classes of service. Cells may arrive to a VC queue or a QBin queue but will depart from a QBin queue. Accordingly, cells may be moved from VC queues to QBin queues. Cells are serviced according to the use of QBin Groups. A QBin Group (QBG) includes a number of logical queues (QBins) of cells to be transported in the digital network. After a QBG is selected, one of its logical queues is selected for servicing. The QBG may be selected by examining all of the QBGs to find an eligible QBG which is most overdue for service. A QBin of the selected QBG may then be selected by examining each of the QBins comprising the selected QBG to find the most overdue for service. The QBGs may correspond to virtual interfaces.

48 Claims, 10 Drawing Sheets

U.S. PATENT DOCUMENTS

| | | | |
|---|---|---|---|
| 5,541,919 A | 7/1996 | Yong et al. | |
| 5,542,068 A | 7/1996 | Peters | |
| 5,546,389 A | 8/1996 | Wippenbeck et al. | |
| 5,548,587 A | 8/1996 | Bailey et al. | |
| 5,550,823 A * | 8/1996 | Irie et al. | 370/413 |
| 5,555,264 A | 9/1996 | Sallberg et al. | |
| 5,557,604 A | 9/1996 | Usumi et al. | 370/253 |
| 5,557,607 A | 9/1996 | Usumi et al. | |
| 5,568,477 A | 10/1996 | Galand et al. | |
| 5,570,362 A | 10/1996 | Nishimura | |
| 5,584,015 A | 12/1996 | Villette et al. | |
| 5,600,820 A | 2/1997 | Johnston | |
| 5,617,416 A | 4/1997 | Damien | |
| 5,625,625 A | 4/1997 | Oskouy et al. | |
| 5,633,861 A | 5/1997 | Hanson et al. | |
| 5,680,582 A | 10/1997 | Slayden | |
| 5,701,495 A | 12/1997 | Arndt et al. | 395/736 |
| 5,704,047 A | 12/1997 | Schneeberger | |
| 5,742,606 A * | 4/1998 | Iliadis et al. | 370/413 |
| 5,742,765 A | 4/1998 | Wong et al. | |
| 5,765,032 A | 6/1998 | Valizadeh | |
| 5,768,275 A | 6/1998 | Lincoln et al. | |
| 5,793,747 A * | 8/1998 | Kline | 370/230 |
| 5,796,735 A | 8/1998 | Miller et al. | |
| 5,812,527 A | 9/1998 | Kline et al. | 370/232 |
| 5,838,677 A | 11/1998 | Kozaki et al. | |
| 5,844,901 A | 12/1998 | Holden et al. | 370/399 |
| 5,850,395 A | 12/1998 | Hauser et al. | |
| 5,854,911 A | 12/1998 | Watkins | |
| 5,875,352 A | 2/1999 | Gentry et al. | |
| 5,898,688 A | 4/1999 | Norton et al. | |
| 5,901,147 A * | 5/1999 | Joffe | 370/412 |
| 5,917,828 A | 6/1999 | Thompson | |
| 5,970,064 A | 10/1999 | Clark et al. | 370/351 |
| 5,974,466 A | 10/1999 | Mizutani et al. | |
| 5,978,856 A | 11/1999 | Jones | |
| 5,982,783 A | 11/1999 | Frey et al. | |
| 5,999,518 A | 12/1999 | Nattkemper et al. | |
| 5,999,533 A | 12/1999 | Peres et al. | |
| 6,011,775 A | 1/2000 | Bonomi et al. | |
| 6,028,844 A | 2/2000 | Hao et al. | |
| 6,034,945 A | 3/2000 | Hughes et al. | |
| 6,058,114 A | 5/2000 | Sethuram et al. | |
| 6,084,882 A | 7/2000 | Bailey et al. | |
| 6,201,813 B1 | 3/2001 | Klausmeier et al. | |

* cited by examiner

MULTI-STAGE QUEUING DISCIPLINE

RELATED APPLICATIONS

This application is related to the following co-pending applications, each assigned to the Assignee of the present application:

application Ser. No. 08/884,999, filed Jun. 30, 1997, entitled "Method and Apparatus for Maximizing Memory Throughput", by Daniel E. Klausmeier and Kevin Wong.

application Ser. No. 08/884,705, filed Jun. 30, 1997, entitled "Method and Apparatus for Using ATM Queues for Segmentation and Reassembly of Data Frames", by Daniel E. Klausmeier, Kevin Wong, and David A. Hughes, which issued as U.S. Pat. No. 6,201,813 on Mar. 13, 2001.

FIELD OF THE INVENTION

The present invention relates to a method and apparatus for handling information, sent through a digital network and, more specifically, to a method and apparatus for organizing and servicing cells at a switch within such a network.

BACKGROUND OF THE INVENTION

Asynchronous Transfer Mode (ATM) or "cell switching" is a method of transmitting digital information wherein the information is broken into equal sized units called "cells." The individual cells of information are transmitted from a source node to a destination node through a "connection". A connection is a pathway through a digital network. A digital network is constructed of digital switches coupled together by digital communication links.

Each cell originates at a source node and is transmitted across the communication links. The communication links carry the cells of information between the digital switches along the connection pathway. The digital switches route the cells from incoming communication links to outgoing communication links and finally to a destination node.

Each digital switch can be connected to several communication links. Furthermore, each communication link can carry several different connections simultaneously. Typically, a cell memory or buffer is used for temporarily holding cells prior to transmission on a communication link. The cell memory is arranged into logical queues. Several queues may be used for separating different types of services and connections. For example, cells belonging to higher priority connections may be stored in queues that have a higher priority of service. In some cases, a separate queue may be assigned to each connection. Servicing a queue entails removing a cell from the queue and sending the cell out on a communication link or to a destination node coupled to the digital switch. A service algorithm is employed to select a queue for service. To fully utilize the bandwidth of a communication link, a cell should be selected for service during each service time, where a service time is equal to the time required to transmit a cell on the communication link.

Typically, switches are capable of handling different classes of cell traffic, each class having different characteristics and different service requirements. The various classes of cell traffic might include high priority traffic, voice, high speed deterministic traffic, bursty data, etc. Typically, each of these traffic types are buffered at each switch in accordance with their particular sensitivities to network delay and cell loss. Cell loss may occur due to intermittent short term overload of network bandwidth and lack of adequate buffer capacity. Each class of traffic may be placed in a preassigned queue at each switch, each queue having a different service priority. Servicing algorithms are typically employed to discriminate between traffic classes in order to allocate bandwidth. Delay is managed by properly sizing the queue depths and prioritizing transmission within a class.

Even with sophisticated queuing and service algorithms, however, congestion (due to excess arriving traffic at a switch) can occur. This congestion is typically divided into three categories: short term, medium term and long term. Short term congestion management, typically handled by discarding traffic at the queue, may be done haphazardly or, preferably, by selecting cells marked with their "discard eligibility". Long term congestion is typically controlled by admission policies that allocate resources (e.g., bandwidth and buffers) at the time a connection is established. If no resources are available, the connection is not allowed. Medium congestion control is generally accomplished through open loop or closed loop techniques. Open loop control techniques generally involve no explicit feedback from the network and congestion is controlled by smoothing the flow of input traffic. Closed loop techniques sense a level of congestion on a virtual circuit and control the in-flow of traffic based on feedback of congestion status information to the source terminal.

SUMMARY OF THE INVENTION

It is an object of the invention to provide a method and apparatus for efficiently organizing and servicing cells which flow through a digital switch.

In one embodiment, a method of servicing cells within a switch of a digital network is provided. Incoming cells are placed into a queue in a cell memory until the cell is serviced. The switch maintains various cell queues, including VC queues that correspond to individual connections and QBin queues that correspond to various classes of service. These queues are preferably implemented through the use of linked lists. Cells may arrive to a VC queue or a QBin queue but will depart from a QBin queue. Accordingly, cells may be moved from VC queues to QBin queues at a rate depending upon network bandwidth availability.

Cells may be serviced as follows: First, one of a number of QBin groups (QBGS) is selected. The QBGs contain a number of logical queues (QBins) of cells to be transported in the digital network. Second, one of the logical queues from the selected QBG is selected.

A QBG may be selected by examining each of the QBGs to determine which QBG is most eligible for servicing. That is, the QBG which is selected is the one that is most overdue for service. An individual logical queue from the selected QBG may then be selected by examining the states of each of the logical queues comprising the selected QBG and selecting one of the logical queues for servicing based on its state.

In a further embodiment, a method of allocating bandwidth among a plurality of connections in a cell switched digital network is provided. The method selects a group of logical queues, from among a number of such groups, for servicing. Each queue of the group may have one of a number of connections within the network assigned thereto. The method then selects one of the logical queues of the selected group of queues for servicing. Each of the logical queues may correspond to a class of service within the network, each class of service having an associated service rate. The selection of the group of logical queues may be accomplished by computing a minimum theoretical departure time (TDT) for each of the groups, each TDT representing a time at which a corresponding group of queues may be serviced. Using the TDTs, groups of queues which are eligible for servicing are determined and one of the eligible groups is selected. One of the logical queues of the selected group may be selected for servicing based on its own associated TDT if the queue is in a first state or based on a service delay accumulator value and a priority if the queue is in a second state.

In yet another embodiment, a virtual interface having a number of logical queues corresponding to a plurality of classes of service is provided. The virtual interface may include a scheduler configured to select one of the logical queues for service according to a transmission requirement for a class of service associated with said selected logical queue. The virtual interface may further be configured to limit a number of cells to be stored in a memory associated therewith according to one or more thresholds. Such thresholds may include a cell maximum for the virtual interface, a cell maximum for the memory, a cell loss priority threshold, an early packet discard threshold, an explicit forward congestion indicator threshold, etc.

A further embodiment of the present invention may include a digital switch which includes a number of logical queues of cells stored in a memory, each logical queue having an associated service priority, the logical queues being arranged in a number of groups. The switch may further include selection logic coupled to the memory and configured to select one of the logical queues associated with a first of the groups for servicing.

These and other features and advantages provided by the present invention will be apparent from the detailed description which follows and upon reference to the accompanying figures described therein.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Methods and apparatus for implementing a multi-stage queuing discipline are disclosed. Although discussed with reference to certain illustrated embodiments, upon review of this Specification, those skilled in the art will recognize that the present invention may find application in a variety of congestion management systems. Therefore, in the following description the illustrated embodiments should be regarded as illustrative only and should not be deemed to limit the scope of the present invention.

Figure 1:
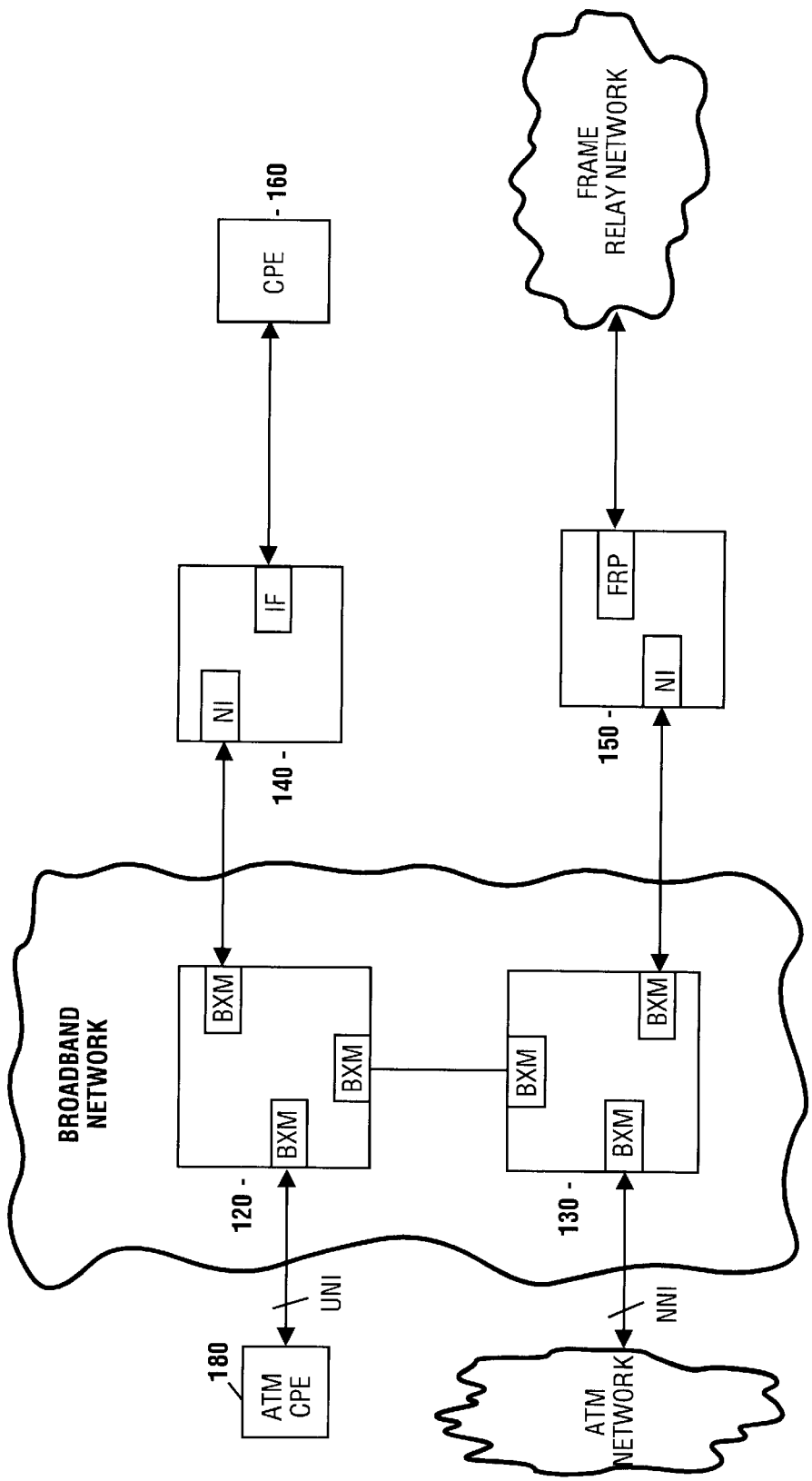
FIG. 1 illustrates a digital communication network constructed with digital switches.

FIG. 1 illustrates a digital communications network. The network illustrated in FIG. 1 is a cell switched digital communication network constructed of digital switches that are capable of building virtual circuits for routing cells. Switches 120 and 130 serve as the backbone for a broadband digital Wide Area Network (WAN). Switches 140 and 150 couple smaller narrowband digital communication links to the broadband digital network.

Each digital switch 120 and 130 is coupled to one or more broadband digital communication links. Examples of broadband digital communication links include E3 lines, T3 lines, OC3 lines and OC12 lines. The digital switches 120 and 130 are also coupled to digital switches 140 and 150 using broadband digital communication links.

Each digital switch 140 and 150 in FIG. 1 is used to couple slower digital communication links to the broadband digital communication network. The customer premise equipment (CPE) 160 may consist of any type of digital communication equipment such a Private Branch Exchange (PBX) or a packet router.

Each digital switch 120 and 130 includes one or more broadband switch modules (BXMs). The BXMs in each digital switch 120 and 130 can be used to directly connect a digital switch (e.g., digital switch 120) to any customer premise equipment (CPE) 180 that uses asynchronous transfer mode (ATM) communications and supports the proper interface. In one embodiment, an OC3 based communication link is used to carry the information. The BXMs may also support an interface which allows the digital switches 120 and 130 to be connected together (or to other networks) via one or more high speed digital communication links.

Figure 2:
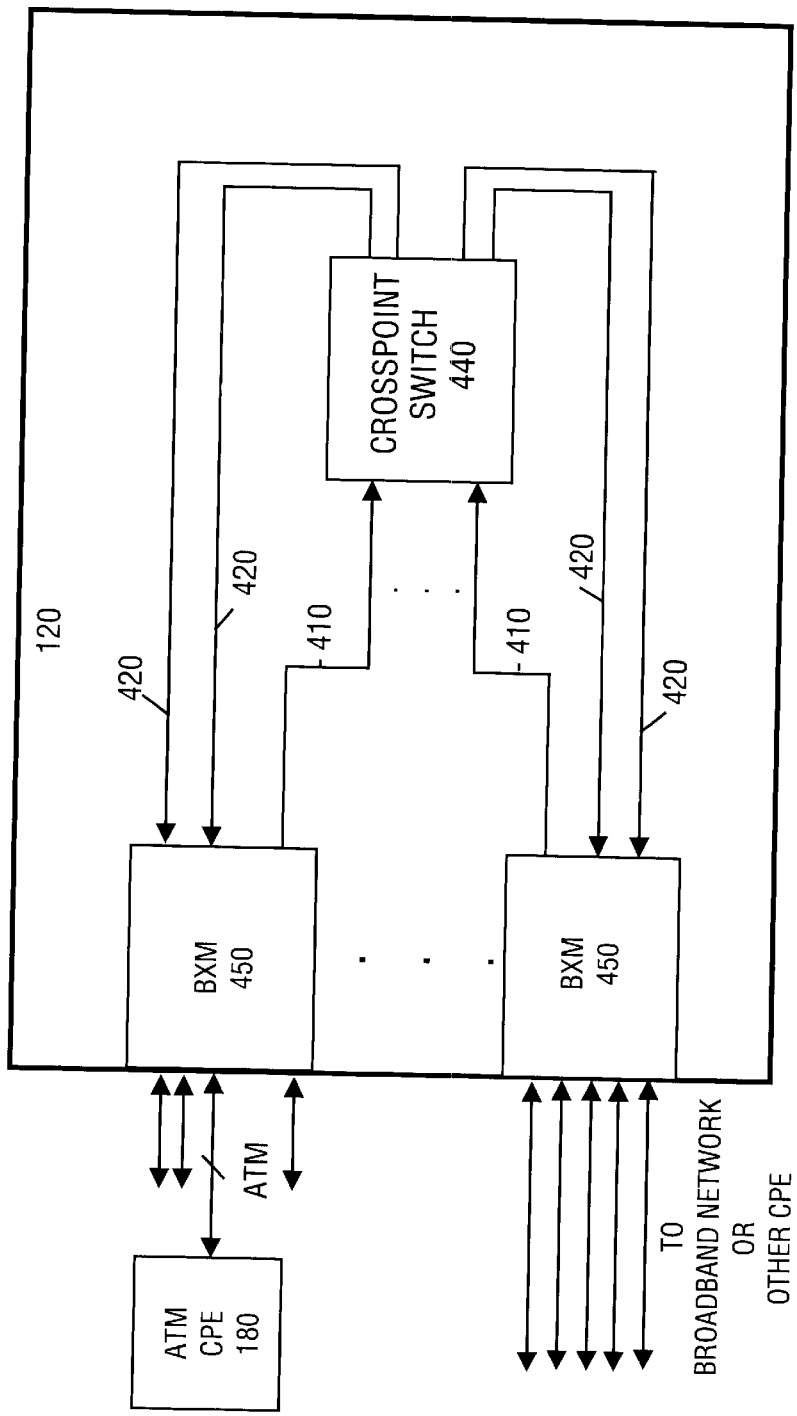
FIG. 2 illustrates an internal block diagram of a digital switch.

FIG. 2 illustrates a block diagram of the internal structure of a digital switch 120. Each digital switch 120 consists of a plurality of BXMs 450 and a Crosspoint Switch 440. BXMs 450 and Crosspoint Switch 440 may each comprise one or more cards (e.g., front and back cards) which are housed within switch 120.

Each BXM 450 may include a network interface connected to a digital communication link. Every BXM 450 may also be coupled to a high-speed serial link 410 within the digital switch 120. In general, cells received from one of the digital communication links at one of the BXMs 450 are transferred from that BXM to Crosspoint Switch 440 across a high-speed link 410. Crosspoint Switch 440 then routes those cells to another BXM 450 across a high-speed link 420. Ultimately, the cells are transmitted out of switch 120 on a digital communication link coupled to the second BXM. The asymmetric design of switch 120 allows two BXMs 450 to transmit cells through Crosspoint Switch 440 to a single BXM 450 simultaneously.

Figure 3:
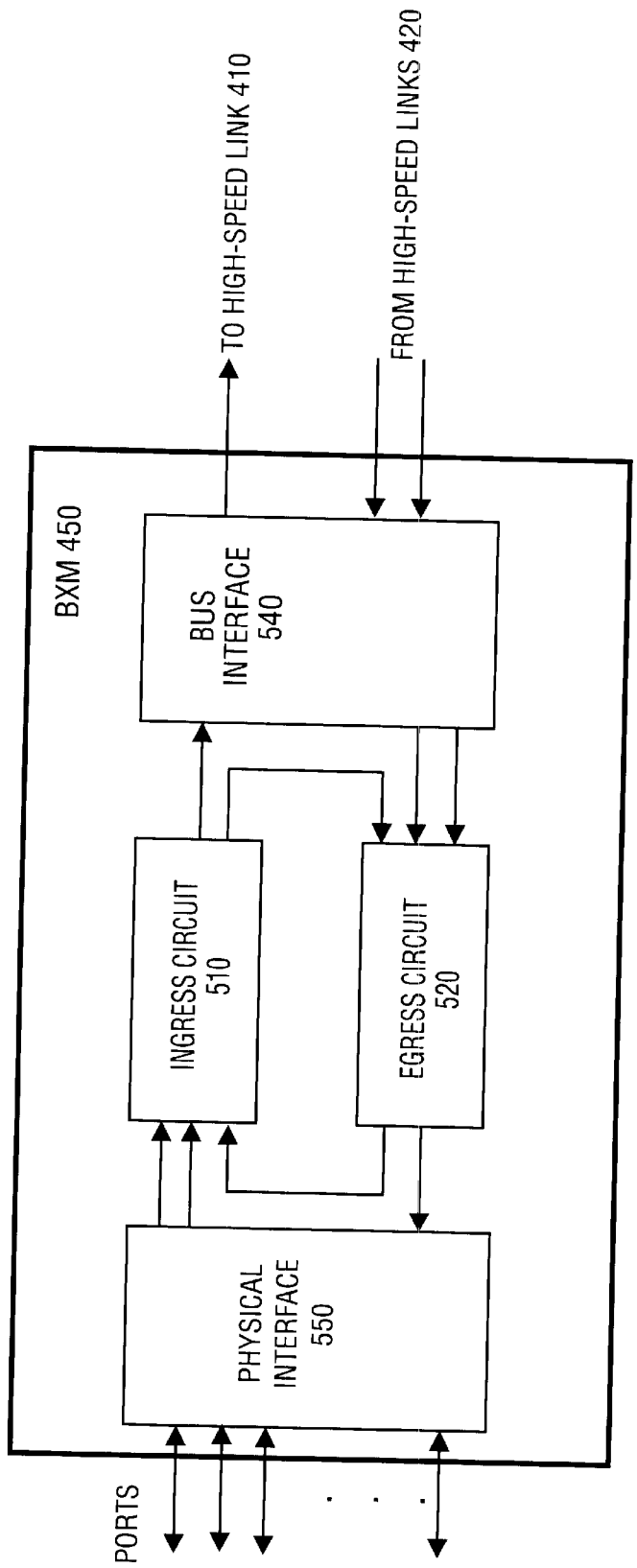
FIG. 3 illustrates an internal block diagram of a broadband switch module (BXM) of a digital switch.

FIG. 3 illustrates an internal block diagram of a BXM 450. The BXM 450 includes an ingress circuit 510, an egress circuit 520, a bus interface circuit 540 and a physical interface circuit 550. The ingress circuit 510 processes incoming cells received from one of the digital communications links through physical interface circuit 550. The egress circuit 520 processes outgoing data cells received from bus interface circuit 540. Ingress circuit 510 and egress circuit 520 may be substantially similar in design. The bus interface circuit 540 is coupled to both the ingress circuit 510 and the egress circuit 520 and distributes data cells to and from the high speed links 410 and 420 within the digital switch 120. The physical interface circuit 550 is also coupled to the ingress circuit 510 and the egress circuit 520 and distributes cells to and from the digital communication links coupled to the physical interface circuit 550 through one or more ports. In one embodiment, a BXM 450 is capable of receiving cells from high speed links 420 at a rate of 2×OC12. That is, bus interface circuit 540 is capable of receiving cells from each of two high speed links 420 at a rate of OC12. Cells may be transmitted to a high speed link 410 or a port at a rate of 1×OC12.

As will become apparent, as cells are received at switch 120, they are organized into logical queues depending on their associated connections or classes of service. Later, the cells are transmitted out of switch 120, generally according to the demands of their associated classes of service. The receive and transmit interfaces to switch 120 present potential points of congestion for the cells. For example, ingress circuit 510 has two receive interfaces and only one transmit interface. Thus, congestion may occur if cells are received on both of the receive interfaces and are to be transmitted on the single transmit interface. Likewise, egress circuit 520 has two receive interfaces and a single transmit interface and congestion may result if cells received on the two receive interfaces compete for the single transmit interface. The use of logical queues at these interfaces (as described in detail below) helps to avoid cell loss when congestion occurs at these points.

To properly manage the logical queues, a number of accounting records for each interface, connection and class of service are maintained at switch 120. For example, for each interface, records which track the total number of cells stored in memory for that interface are maintained. Such records (along with associated cell maximum thresholds for each interface) allow for control over the number of cells stored in memory per interface, thus preventing a single interface from monopolizing the memory resources of switch 120. Likewise, records regarding the total number of cells stored for each class of service and each connection are maintained in order to prevent a single class of service or connection from monopolizing the memory resources of switch 120 (and for limiting cell transfer delay in the case of classes of service). Threshold values including maximum cell counts, CLP (cell loss priority) thresholds, EPD (early packet discard) thresholds, and EFCI (explicit forward congestion indicator) thresholds are maintained for each class of service and connection. These thresholds are used in the conventional fashion and allow circuitry within switch 120 to make decisions regarding whether or not to accept new cells for a given connection or class or service. In general, cell admission policies may be based on a comparison of the number of cells of a given connection or class of service (or the total number of cells) already stored in memory at switch 120 with a preestablished threshold. Any or all of these thresholds may be dynamically scaled as memory resources become filed in order to further prevent to possibility of congestion. Related U.S. patent application Ser. No. 08/648, 556, filed May 15, 1996, entitled Method and Apparatus for Per Traffic Flow Buffer Management, which issued as U.S. Pat. No. 6,034,945 on Mar. 7, 2000, and related U.S. patent application Ser. No. 09/490,548, filed Jan. 24, 2000, entitled Method and Apparatus for Per Traffic Flow Buffer Management, which is a continuation of U.S. patent application Ser. No. 08/648,556, filed Mar. 15, 1996, now U.S. Pat. No. 6,034,945 all of which are assigned to the Assignee of the present invention, discuss such dynamic scaling techniques.

Figure 4:
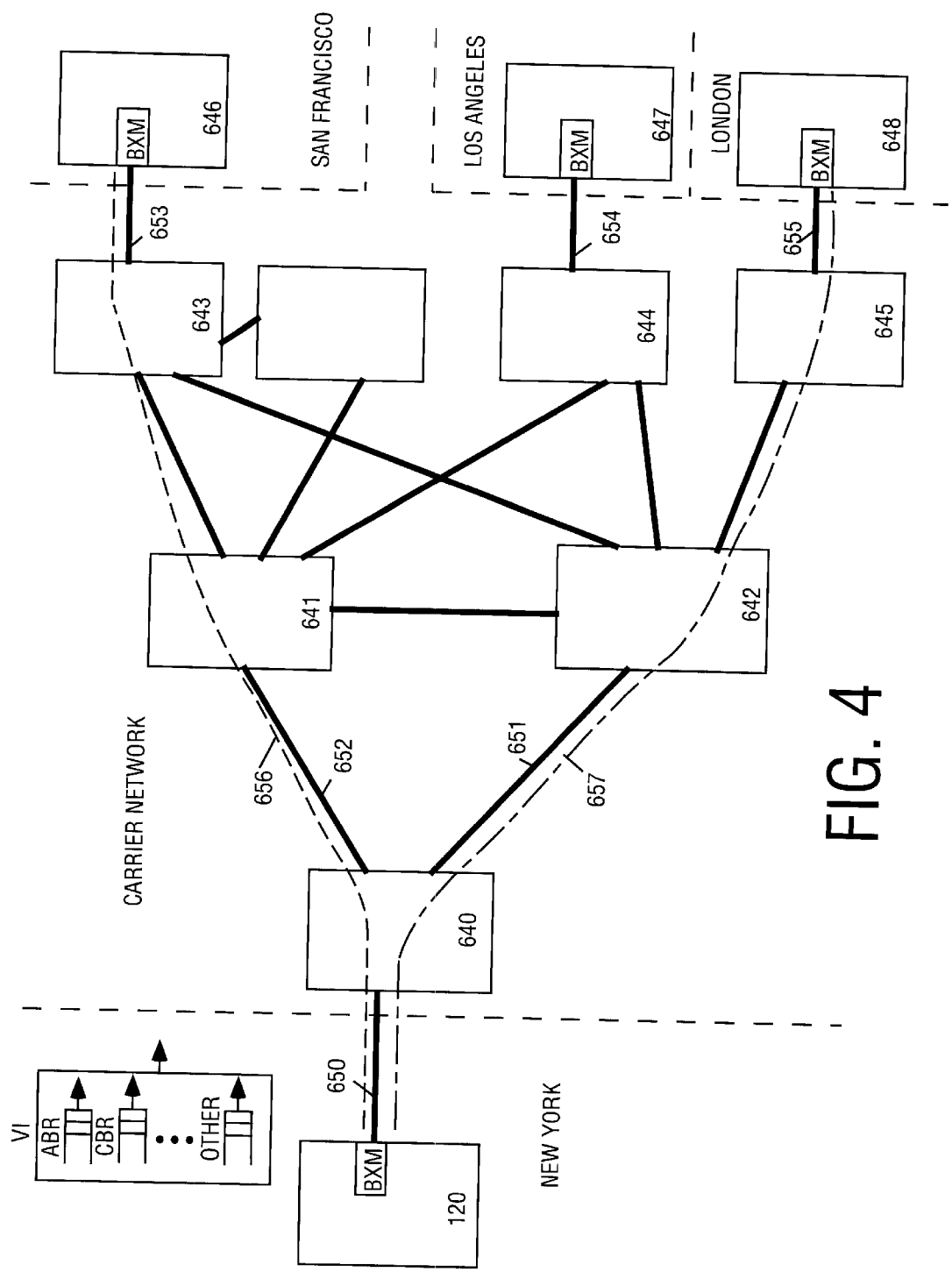
FIG. 4 illustrates the concept of a virtual interface according to one embodiment of the present invention.

The idea of congestion management for physical interfaces may be extended to provide congestion management for virtual interfaces (VIs). Accordingly, in one embodiment, the ingress and egress circuits 510 and 520 are designed to support the concept of a virtual interface, which is discussed with reference to FIG. 4. As shown, a user in New York may need to exchange information (e.g., voice, video and/or data) with other users in remote locations such as San Francisco, Los Angeles and/or London. To achieve this goal, rather than establishing a costly private network, the user may purchase or lease one or more virtual path connections 656, 657 through a carrier network. The carrier network includes a number of digital switches 640–645 located in various geographic regions. The switches 640–645 are interconnected by high speed, digital communication links, e.g., links 651 and 652. The user equipment, e.g., switches 120 and 653–655, access the carrier network through one or more of the carrier switches 640–645 through one or more associated communication links 650, 653–655.

The virtual path connections 656, 657 may each carry several ATM circuit connections between the user switches 120, 646 and 648. Generally, however, the virtual path connections are unsuitable for mixing multiple data-type connections between user switches. That is, the virtual path connections are typically constant bit rate (CBR) connections and may be unsuitable for carrying voice and video connections (which require constant bandwidth due to the data-type being sensitive to delay) along with bursty data connections (which can typically tolerate relatively long delays between transmissions but which may be sensitive to data losses). This presents a problem to the user in New York who wishes to exchange multiple datatypes between switch 120 and switches 646 and 648. For example, if the New York user wishes to exchange voice, video and bursty data on three separate ATM connections between switches 120 and 646, the single CBR virtual path connection 656 may be unable to properly accommodate this traffic (e.g., because of congestion). In the past, the solution to this problem required the purchase of three (or more) separate virtual path connections, one for each of the data-types being exchanged between switches 120 and 646.

The present invention solves the problem of transmitting multiple data-types between switches 120 and 646 across a single virtual path connection by implementing virtual interfaces at switches 120 and 646. This avoids the need for multiple separate virtual path connections. For data being transmitted from New York to San Francisco, a virtual interface ($VI_{SF}$) having multiple queues may be established at switch 120. The VISF may include queues for voice, video and other types of information or data. Each of these queues will be serviced at a rate depending on the particular data type's needs (e.g., voice data is sensitive to delays but may tolerate some degree of loss while bursty data may be relatively insensitive to delay but very sensitive to losses). In this way, the single virtual path connection 656 through the carrier network may be used to carry multiple ATM connections between New York switch 120 and San Francisco switch 646.

Similarly, to support multiple connections between New York and London, a second virtual interface ($VI_{LON}$) may be established at switch 120 for the various data types being transmitted to London switch 648. Thus, the single virtual path connection 657 may be used to support multiple ATM connections between New York and London (of course, a virtual interface would be established at London switch 648 to handle the traffic bound for New York).

Other uses for virtual interfaces include "breaking out" an OC12 or other communication link into several T3 or other lower capacity links. Further uses of virtual interfaces will be apparent to those skilled in the art.

Thus, at switch 120 the logical queues may be organized into groups, which (for egress circuit 520) may correspond to virtual interfaces (VIs). In one embodiment, 32 VIs are supported, each with 16 logical queues. Each VI corresponds to a physical interface, i.e., a communication link, leaving the switch 120. Using the VIs, switch 120 can rate limit the traffic for each of the downstream physical interfaces so that contention is avoided. A service algorithm will first choose a VI to service and then select a logical queue from the chosen VI.

Figure 5:
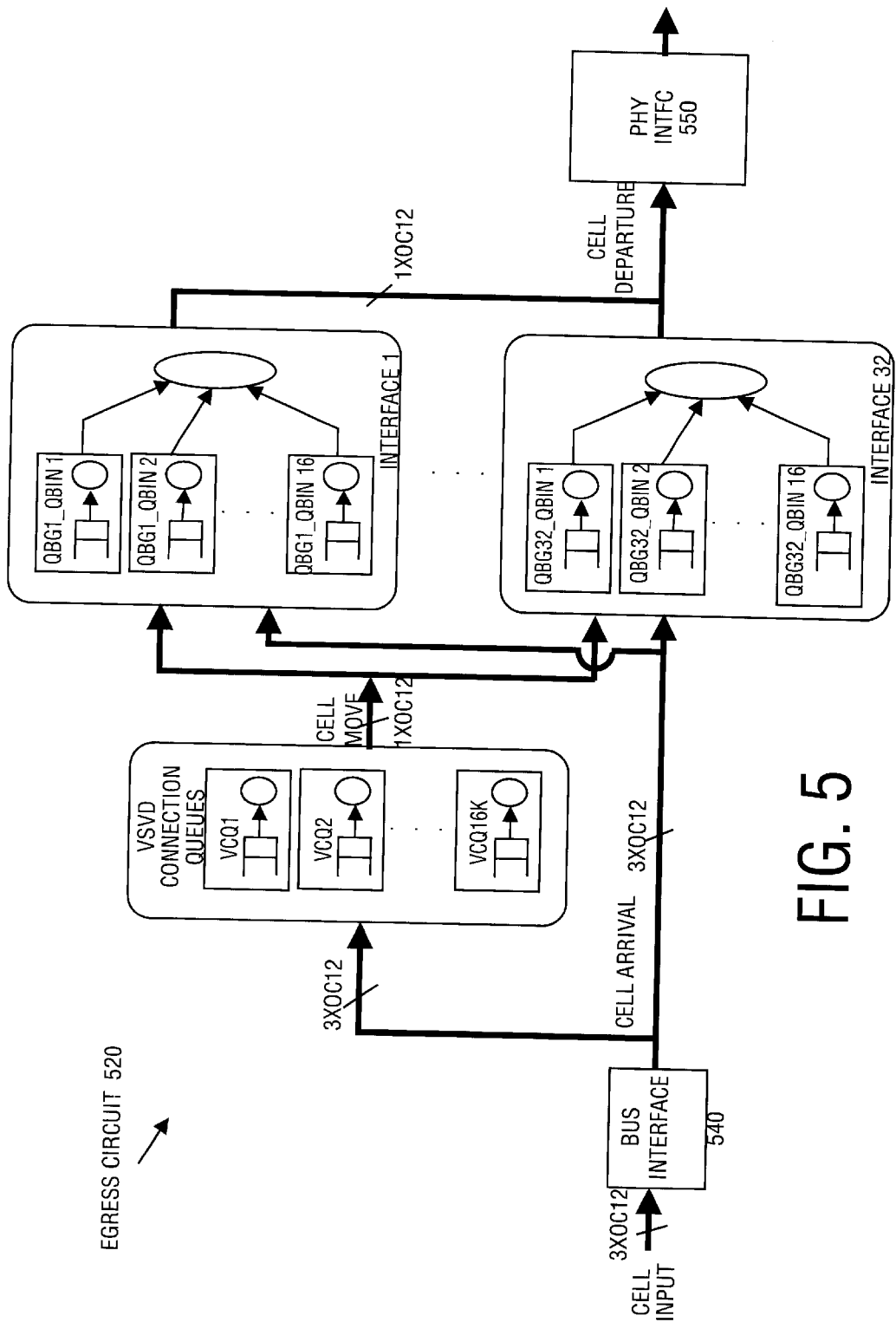
FIG. 5 is a functional representation of an egress circuit in a broadband switch module (BXM)

FIG. 5 illustrates the functional components of egress circuit 520. Hereafter, the description is generally directed to egress circuit 520, however, it should be appreciated that ingress circuit 510 is substantially similar. For egress circuit 520, cells are received from bus interface circuit 540 and are passed to an ATM communication link through one or more ports of physical interface 550.

For egress circuit 520, incoming cells are placed into a queue in a cell memory until the cell is serviced. Egress circuit 520 maintains various cell queues, including VC queues that correspond to individual connections and QBin queues that correspond to various classes of service. These queues may be implemented through special memory components, such as FIFOs. However, such an implementation would be expensive and inflexible. For example, a cell memory that supports a thousand connections would require a thousand separate queue-implementing memory components for just the VC queues. Furthermore, it would be difficult for VC queues that correspond to connections with heavy traffic to "borrow" memory from VC queues that correspond to connections with light or no traffic. Consequently, the present embodiment stores incoming cells in separate dynamic random access memory (DRAM), and implements the various queues through the use of linked lists.

The manner in which such linked list queues are implemented and controlled is discussed in detail in a related application Ser. No. 08/884,999, entitled "Method and Apparatus for Maximizing Memory Throughput", filed Jun. 30, 1997 by Daniel E. Klausmeier and Kevin Wong. Briefly, as cells are received at egress circuit 520, they are temporarily stored in a cell memory prior to transmission on one of the outgoing communication links. A linked list data base is used to keep track of the location and sequence of the cells in the cell memory. That is, a series of "next entry" pointers are established such that each sequence of entries are linked together. Each connection and class of service supported by switch 120 has a corresponding linked list queue (VC queue or QBin queue, respectively) and a queue manager maintains the links in each of the queues so that the entries (i.e., pointers) in the linked lists are updated to reflect cell arrivals (to the tail of a VC queue or a QBin queue), cell moves (from the head of a VC queue to the tail of a QBin queue) and cell departures (from the head of a QBin queue).

VC queues are implemented to support ABR traffic according to various specifications adopted and proposed by the ATM Forum. Specifically, for ABR VSVD (virtual source virtual destination) connections (as defined in the ATM Forum's "Traffic Management Specification v4.0", March 1996, and its later revisions), the cells are first enqueued in a VC queue and then moved to a QBin queue for servicing at a rate depending upon the dynamics of the available network bandwidth. Other network traffic is received directly into QBin queues for servicing.

The QBins are organized as QBin Groups (QBGs). Each QBG is made up of a number of QBins, each with its own associated service priority. A Queue Controller, which includes selection logic, selects the next eligible QBG and QBin for service based on service eligibility and service priorities.

As indicated above, some cells are enqueued in VC queues prior to being moved to QBins for servicing. A Service Controller determines when cells will be moved from a VC queue to a QBin. To accomplish this task, the Service Controller transmits a signal to the Queue Controller to indicate that a cell should be moved. The signal identifies the source VC queue which is subsequently mapped to an appropriate destination QBin. In response, the Queue Controller updates the linked lists so that the pointers which indicate the memory location of cell being moved are removed from the head of the designated VC queue and are added to the tail of the appropriate QBin queue.

Figure 6:
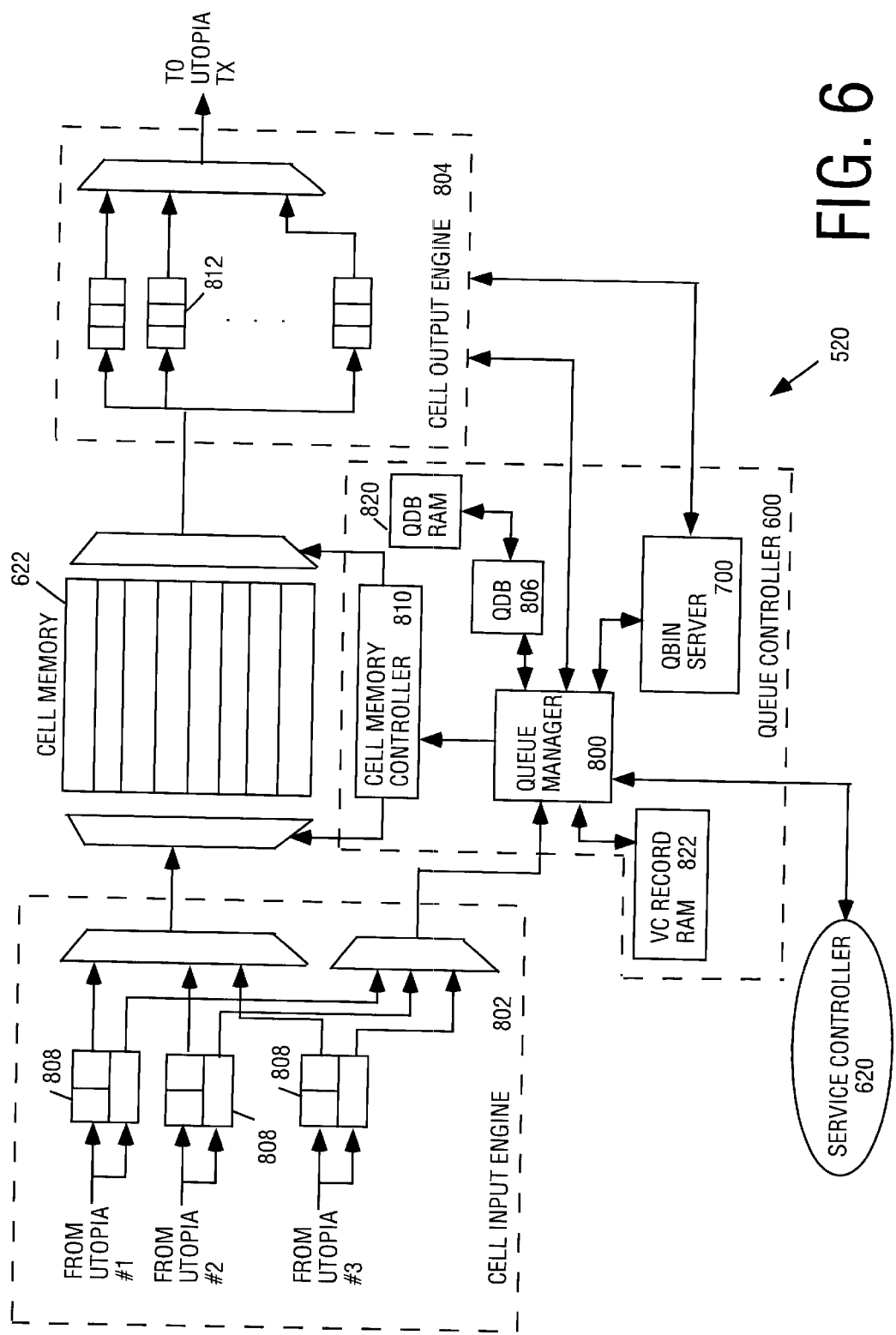
FIG. 6 illustrates an internal block diagram of a queue controller for the egress circuit shown in FIG. 5.

FIG. 6 illustrates a block diagram of the structure of egress circuit 520 according to one embodiment of the present invention. Egress circuit 520 includes Queue Controller 600, Service Controller 620, cell input engine 802 and cell output engine 804. Also shown in FIG. 6 is off chip cell memory 622 which is used to store the actual cells. Queue Controller 600 includes a queue manager 800 and a cell memory controller 810. Queue manager 800 controls the storage of cells in cell memory 622 through cell memory controller 810 and keeps track of the location and sequence of the cells so stored through the use of linked lists. The linked lists are stored in a queue data base random access memory (QDB RAM) 820 and managed through the use of queue data base controller (QDB) 806. Because of the cell storage supported by switch 120, a separate (i.e., off chip) QDB RAM 820 is used. In one embodiment, QDB RAM 820 is a synchronous SRAM.

The cell egress circuit 520 illustrated in FIG. 6 is further explained with reference to the cell arrival and departure processes. However, before discussing these processes in detail, it is important to understand the various data structures used by egress circuit 520 to control these processes. Accordingly, a brief overview of these data structures, which may be stored in VC Record RAM 822, is presented.

Included in the data structures which may be stored in VC Record RAM 822 are configurations, state information and statistics for each VC supported by switch 120. Among these are the QBG number (QBG#) and virtual interface number (VI#) that the VC will be mapped to; the QBin number (QBin#) for the QBG of interest; the discard state (used for frame-based discard) of the VC received; the current cell count for the number of cells stored in the cell memory 622 that correspond to the VC of interest; the new GFC, VPI and VCI fields for departing cells along with translate enable values for these fields; and a number of threshold values. The threshold values include cell count thresholds for the maximum number of cells allowed in cell memory 622; CLP (cell loss priority) thresholds, EPD (early packet discard) thresholds, and EFCI (explicit forward congestion indicator) thresholds. These thresholds are used in the conventional fashion but are preferably stored so that they each share a common exponent value (i.e., the thresholds are stored as $M2^E$, where E is a common four-bit exponent value and M is a four-bit mantissa value), and the common exponent value is also stored as part of the overall data structure. Because of the number of connections supported by switch 120, the VC Record RAM is an off chip RAM.

Cell input engine (CIE) 802 acts as a Utopia-2 master to receive incoming cells over one of its three Utopia-2 receive interfaces. Each Utopia-2 receive interface may be associated with a number of ATM communication links (in the case of ingress circuit 510) or with the high-speed links 420 (in the case of egress circuit 520). In either case, port or bus interface circuits (not shown) which comply with the well known Utopia-2 standard for carrying ATM cells between devices provide the cells to each of the Utopia-2 receive interfaces. CIE 802 stores the received cells in one of its receive queues 808 before converting the 16-bit Utopia-2 data into 64-bit data for storage in cell memory 622.

CIE 802 implements a queue depth of 2 for the Utopia-2 receive interfaces. This allows CIE 802 to receive one cell per port every cell tic (a cell tic used to synchronize data flow through the Queue Controller 600 and up to one cell may be received on each Utopia-2 receive interface during a cell tic), provided that the previous cell is granted service when the tic arrived. If the previous cell has been committed to the cell memory 622 at the cell tic, CIE 802 checks its Utopia-2 receive interface and starts receiving a new cell if the associated Utopia-2 slave has a cell available. Note that all three ports function independently and they can receive cells in parallel. After CIE 802 receives a cell, it extracts the cell's connection, source and other information, and presents the information to queue manager 800 for processing.

Upon receipt of the cell information provided by CIE 802, queue manager 800 checks the relevant cell count threshold to determine whether the newly arriving cell can be accommodated in the cell memory 622. If not, the cell is discarded. If space is available for the arriving cell, queue manager 800 obtains cell count threshold information for the corresponding VI from VC Record RAM 822 and determines whether the VI threshold would be exceeded by adding the newly arriving cell. If the threshold would be exceeded, the cell is discarded. Otherwise, queue manager 800 obtains the cell count and other threshold information for the VC associated with the arriving cell. These thresholds are checked to determine whether the cell will be accepted. If the VC is already storing its maximum number of allowed cells (as determined by the cell count and threshold values), the new arriving cell is discarded. Assuming, however, that the cell is accepted, queue manager 800 increments the VC connection statistics and the VC and VI cell counts associated with the arriving cell and also increments the global cell count value which represents the total number of cells stored in cell memory 622. If the cell is to be queued directly to a QBin and not a VC, then queue manager 800 obtains the appropriate QBin and QBG cell counts and thresholds from an on chip table and these values are used to determine whether the newly arriving cell may be accepted or not. If the cell is accepted, queue manager 800 increments the associated QBin and QBG cell counts.

For cells that are accepted, queue manager 800 examines the information provided by CIE 802 and determines where to store the cell in cell memory 622. This storage location is linked to the tail of the appropriate queue (VC queue or QBin queue) using QDB 806. Ultimately, the cell is stored to cell memory 622 from CE 802 under the control of cell memory controller 610.

The cell departure process involves the use of cell output engine (COE) 804. Cells depart from QBins and QBin Server 700 is responsible for selecting a QBin for service. The details of the service selection process are set forth below and once a QBin has been selected for service, queue manager 800 uses QDB 806 to find the cell memory 622 location of the cell at the head of the selected QBin. Queue manager 800 provides this information to cell memory controller 810 and the cell at the designated storage location is read out of cell memory 622 to COE 804.

In one embodiment, COE 804 may include 16 output queues 812, each 5-cells deep, one for each Utopia-2 device (port or slot) supported by switch 120. For a departing cell, CMC 810 loads the cell from cell memory 622 into one of the COE output queues 812. Connection information from the departing cell is extracted and provided to queue manager 800. Queue manager 800 uses this information to retrieve and update the VC queue and QBin queue statistics and cell counts and provides COE 804 with VCI, VPI, and EFCI update information for the departing cell.

COE 804 constantly polls the 16 Utopia-2 transmit slots in a round-robin fashion. If appropriate, COE 804 retrieves a cell from an output queue 812 and transmits the cell at the next cell tic. While the cell is being transmitted, COE 804 begins polling starting at the next sequential port address. Polling stops when a port is identified to receive a cell at the next cell tic or when all the ports have been polled in the current cell tic. Polling resumes at the next cell tic.

In addition to cell arrivals and departures, egress circuit 520 also handles cell moves from the head of a VC queue to the tail of an associated QBin queue. Cells are moved according to information provided by Service Controller 620 which schedules move events according to a service algorithm associated with the requirements of a particular connection. The move information is provided to queue manager 800. When queue manager 800 receives the move information it accesses the VC state table (stored in VC Record RAM 822) to obtain the target QBin queue for the designated VC queue. Queue manager 800 then uses QDB 806 to dequeue the cell at the head of the designated VC queue and to enqueue this cell at the tail of the target QBin queue. The details of the memory operations which are used to accomplish this move event are set forth in related application Ser. No. 08/884,999, filed Jun. 30, 1997, entitled "Method and Apparatus for Maximizing Memory Throughput".

If the source VC queue for the move was empty, queue manager 800 recognizes the condition and the VC queue and target QBin queue are not modified. If the source VC queue was not empty, the VC queue and target QBin queue are modified as indicated above and, in addition, queue manager 800 updates the appropriate QBin cell count and statistics. The move status is also reported to Service Controller 620.

Figure 7:
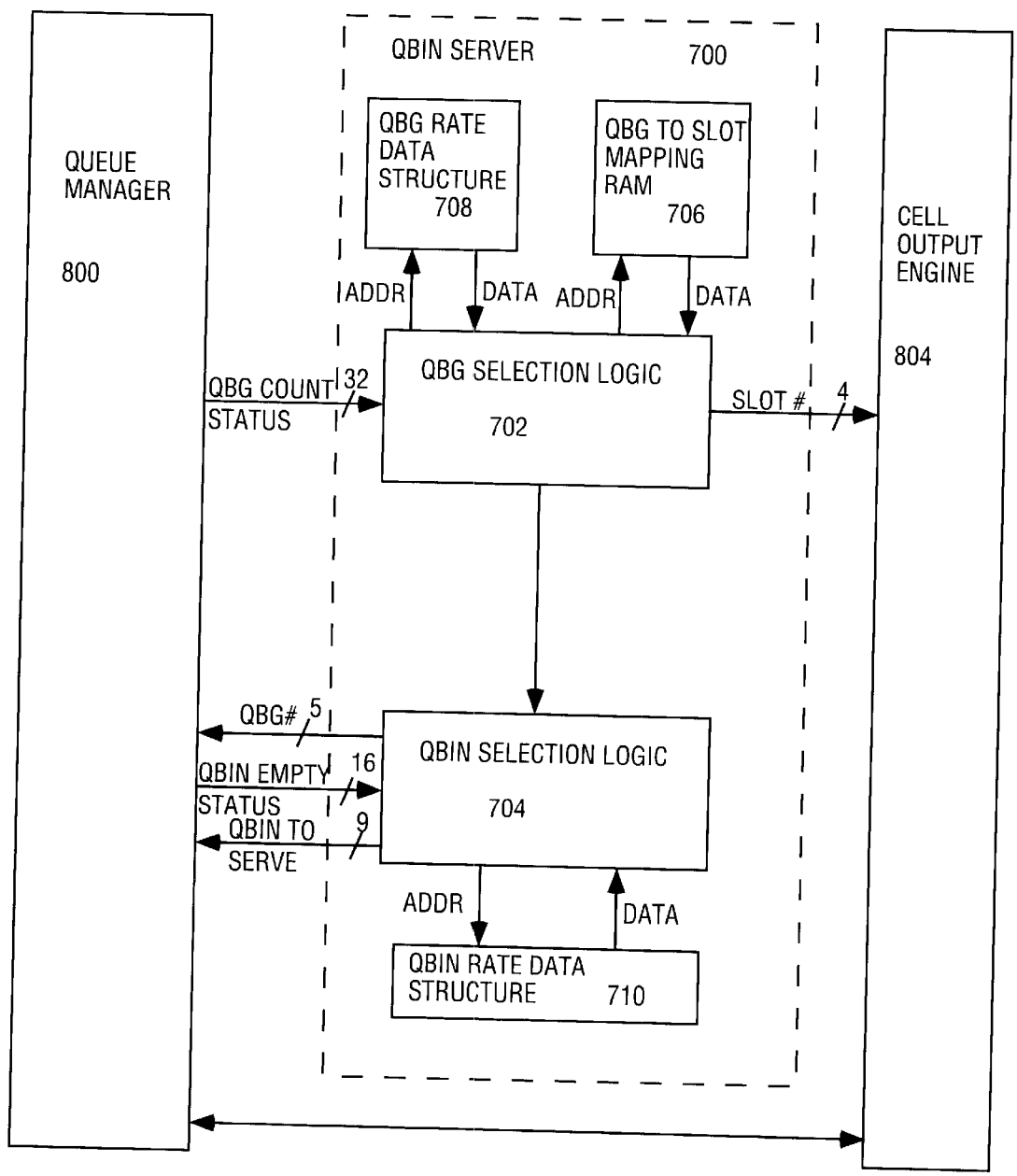
FIG. 7 illustrates a queue server for the queue controller of FIG. 6 according to one embodiment of the present invention.

FIG. 7 illustrates QBin Server 700 in more detail. QBin Server 700 includes QBG selection logic 702 and QBin selection logic 704. QBG selection logic 702 is responsible for selecting the next eligible QBG for service and QBin selection logic 704 selects one of the 16 QBins of the selected QBG. Mapping tables are stored in Mapping RAM 706 for use by QBG selection logic 702 to allow for mapping to appropriate ports. The table is accessed using a 5-bit index (address) which represents the QBG, and the data provided from the table is the appropriate port number to route the cell to.

The QBin Server 700 also keeps track of the queue depth for each of the 16 COE output queues 812. When QBin Server 700 selects a QBG for service, its corresponding output queue depth count is incremented. When COE 804 sends a cell out of an output queue 812, it informs QBin Server 700 and the corresponding queue depth count is decremented. To prevent overflows, QBin Server 700 should not select a QBG for service if its corresponding output queue 812 is full.

To implement the above-described service algorithm, QBin Server 700 uses "Theoretical Departure Times" (TDTs), ineligibility bits and Service Delay Accumulators (SDAs) of all the QBGs to select one QBG for service within each cell time. The TDTs and SDAs are "scratch pad" values calculated from user configurable parameters for each QBG. In particular, each QBG has an inter-cell gap (ICG) time, based on user defined service criteria for cells transmitted within the digital network, and a Relative Service Delay (RSD).

The ICG value determines the maximum bandwidth allowed for the corresponding QBG. The units of the ICG are in cell tics per service, thus the ICG value provides the minimum number of cell tics that must elapse before the QBG becomes eligible for the next service. Servicing the QBG sooner would cause the QBG rate to exceed the maximum programmed value (rate=1/ICG). This upper limit is fixed and is not affected by other QBGs in service.

The RSD value determines the percentage of bandwidth allocated for the corresponding QBG. The rate generated from the RSD is a dynamic value that depends on the RSDs of all the active QBGs in service. The RSD is a unitless quantity that represents the ratio of bandwidth between one QBG and another. For example, if $QBG_0\_RSD=50$ and $QBG_1\_RSD=100$, $QBG_0$ is allocated two times more bandwidth than $QBG_1$. If $QBG_2\_RSD=100$ was activated to service, $QBG_1$ and $QBG_2$ would receive the same amount of bandwidth, while $QBG_0$ would receive twice the bandwidth of $QBG_1$ or $QBG_2$. Scaling the RSDs by the same factor (i.e., $QBG_0\_RSD=500$, $QBG_1\_RSD=1000$, $QBG_2\_RSD=1000$) does not affect the overall relationship between bandwidth allocation.

An illustrative example of the relationship of bandwidth allocation verses RSD value is described as current flowing through a parallel resistor network. The RSD can be thought of as the value of the resistor, while the bandwidth can be thought of as the current flowing through the resistor network. The current flowing through a particular resistor is not fixed, but depends on the number of resistors in the circuit (active QBGs), the value of each resistor, and the total current flowing through the resistor network. The smaller the resistor value, the larger the current that flows through it. The actual bandwidth equation is as follows:

$$\% BW = \frac{RSD_i^{-1}}{\sum_j RSD_j^{-1}}, j = \text{active } QBGs$$

where $\%BW_i$ is the percentage of the bandwidth allocated to $QBG_i$, $RSD_i$ is the RSD value for $QBG_i$, and $RSD_j$ is the RSD values of all active (non-empty) QBGs, including $QBG_i$.

To reduce the amount of memory as well as the decoding overhead required for storing the ICG and RSD values, the ICGs and RSDs may be stored in the $1 \cdot M2^E$ format, where M is a normalized 8-bit mantissa and E is a 4-bit exponent, within a common memory, QBG Rate Data Structure 708. The TDTs have units of tics and are 26-bits wide, including 2-bits to indicate a current time wrap status, 16-bits for an integer portion and 8-bits for a fractional portion. SDAs are 17-bits wide, including 1-bit to keep potential overflow status and 16-bits for an integer portion. Each of these values may be stored in an on-board memory within QBin Server 700.

Figure 8:
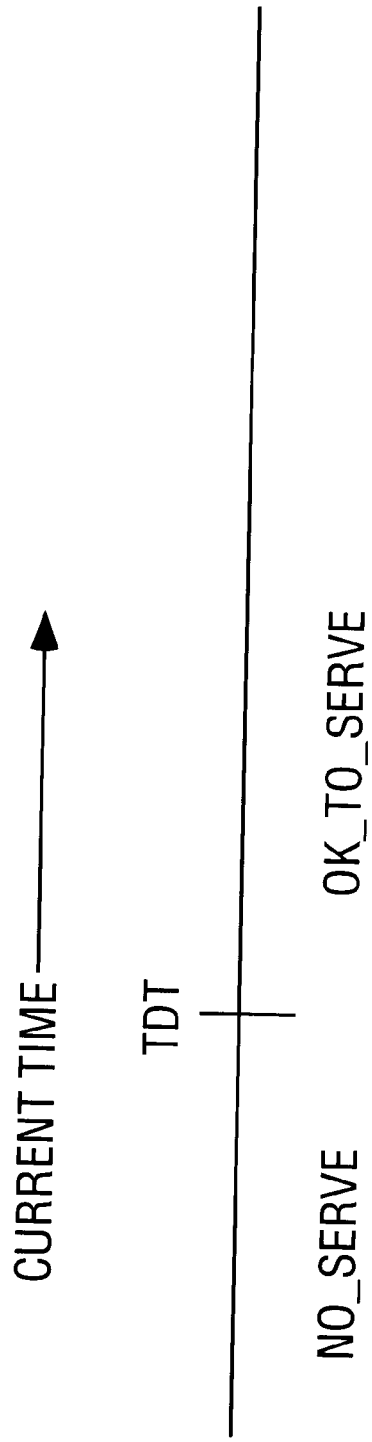
FIG. 8 illustrates QBin Group (QBG) states according to one embodiment of the present invention.

QBGs are serviced according to their respective states. Each QBG can be in one of two possible states depending on the Current Time and the QBG's TDT. The Current Time is maintained by a hardware timer which increments every cell tic and is stored in a 16-bit register in QBin Server 700. The relationship between Current Time and the TDTs is illustrated in FIG. 8. If the QBG_TDT is greater than the Current Time, the QBG is not serviced (i.e., the No_Serve state), because servicing the QBG now would cause the service rate to exceed the programmed maximum QBG rate (according to the QBG_ICG). If the QBG is in the No_Serve region, its ineligibility bit (ig[QBG]) is set. If the QBG_TDT is less than the Current Time, the QBG can be serviced (i.e., OK_to_Serve state).

QBin Server 700 maintains an eligibility list (QBGs sorted by SDA values) to use in determining which QBG should be selected for service. A QBG is eligible for service (i.e., is eligible to have a cell moved from cell memory 622 to a COE output queue 612, if: (1) it is not empty (i.e., the QBG has cells in cell memory 622); (2) it is not in the No_Serve state (i.e., Current Time>QBG_TDT); and (3) its associated COE output queue 612 is not full. If the QBG on top of the eligibility list meets these criteria it is selected for service, otherwise QBin Server 700 finds the next eligible QBG on the list.

When a cell tic arrives, QBin Server 700 reads the SDAs and TDTs out of memory two at a time to reduce the amount of time to selection. The TDTs are used to determine the ig bits which are set if any of the above-described eligibility criteria for a QBG are not met. QBin Server 700 then concatenates the ig bit with the integer portion of the SDA for each QBG to be used as a "value" field for a comparison. The comparison is made using the QBG selection logic 702 shown in FIG. 9.

Figure 9:
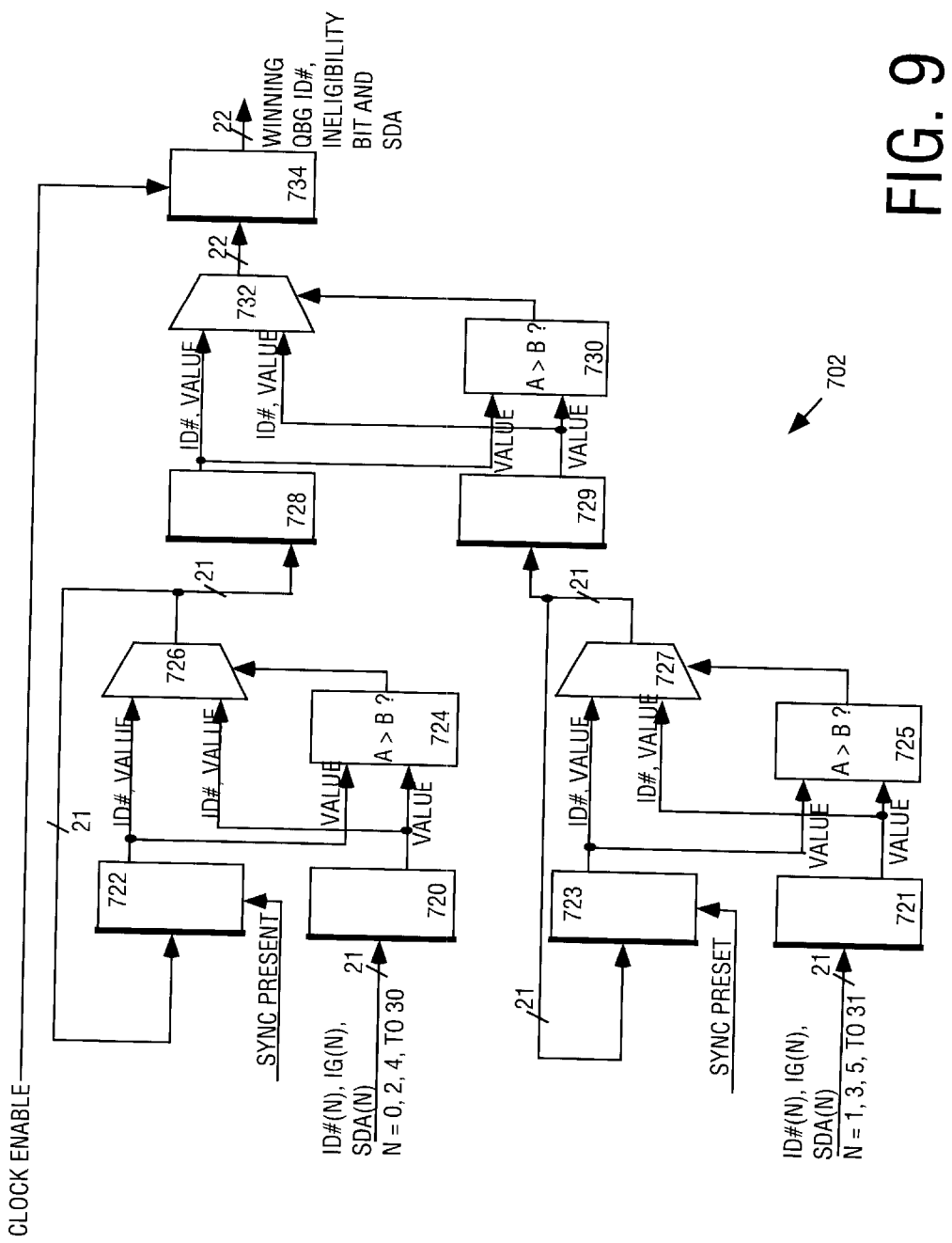
FIG. 9 illustrates QBin group selection logic for use with the queue server of FIG. 7 according to one embodiment of the present invention.

FIG. 9 shows conceptually how the QBG selection is performed, however, in a preferred embodiment the final comparison between upper and lower QBGs is performed using the upper QBG comparison logic (i.e., registers 720 and 722, comparator 724 and multiplexer 726). Such an embodiment reduces the number of gates required for the QBG selection logic 702.

Each set of QBG comparison logic includes a 21-bit register (720 and 721) to latch a 4-bit identification number (id#) and 17-bit "value" (concatenated QBG_SDA and ig bit) of the new QBG to be compared; a 21-bit register (722 and 723) to latch a 4-bit id and 17-bit "value" of the currently winning QBG (in the first cycle of comparison, the new QBG is loaded into the winning QBG register); a 17-bit magnitude comparator (724 and 725) to compare two "values"; and a 21-bit, 2-to-1 multiplexer (726 and 727) to select a winning id# and "value". Outputs from each set of comparison logic are fed into a next set of comparison logic which includes two 21-bit registers (728 and 729) to latch winning upper and lower ids and "values"; a 17-bit magnitude comparator 730 to compare two "values"; and a 22-bit, 2-to-1 mux 732 to select a set of id and "value" for the next QBG to be serviced. The selected QBG id# and "value" are latched into register 734 to be passed to queue manager 800.

The winning QBG is selected for service and QBin Server 700 updates the winning QBG's SDA and TDT as follows:
    new TDT=MAX(old TDT+ICG, QBG Current Time)
    new SDA=old SDA+RSD.

Since both QBG Current Time (CT) and QBG_TDT are implemented with finite numbers of bits, wrap-around problems have to be addressed. Two status bits are used to carry wrap-around relationships between CT and TDT. For one embodiment, the encodings are:

11: TDT wraps one more time that CT.
10: TDT and CT wrap the same number of times.
01: CT wraps one more time than TDT.
00: CT wraps two (or more) more times than TDT.

These status bits are updated after CT wraps or new TDTs are calculated. Status bit transitions for each QBG according to this embodiment are as follows:

11: transitions to 10 when new CT wraps, stays at 11 otherwise.
10: transitions to 01 when new CT wraps, stays at 10 otherwise.
01: transitions to 00 when new CT wraps, stays at 01 otherwise.
00: always stays at 00 when new CT wraps.

The SDA can also wrap when a new SDA is calculated. To Tesolve the wrapping issue, all SDAs are updated every time a QBG is selected for service according to:

if(old SDA>winning SDA)
 new SDA=old SDA−winning SDA;
else
 new SDA=0;

where winning SDA is the SDA value of the selected QBG prior to updating. This keeps all SDA values from accumulating beyond the maximum RSD value, while still maintaining the service delay relationship between the QBGs. This works because the QBG selection logic 702 normally selects the QBG with the smallest SDA value. Subtracting this value from all SDAs would still cause all SDAs to be non-negative and, therefore, zero saturation does not occur. Saturating the result would potentially modify the RSD ratio relationship between QBGs, thus modifying the bandwidth allocation, potentially to an unfair or non-linear relationship. For cases where the QBG selection logic 702 selects a QBG which does not have the smallest SDA, the update tests for negative results and saturates at zero. Such conditions may arise as follows.

Ineligible QBGs are not selected for service, so some ineligible QBGs may have smaller SDAs than a selected (eligible) QBG. Thus, a counter wrap update would cause the ineligible QBGs with smaller SADs to underwrap. In this case, their SDA will saturate at zero. In effect, this causes ineligible QBGs from accumulating service credit during their ineligibility. In a preferred embodiment, SDAs are not updated in the same cell tic the QBG is selected. Rather, the update is done at the beginning of the next cell tic before the selection of the next QBG begins. Thus, there is a possibility that the winning SDA update will wrap before its old SDA is subtracted. This would require one extra wrap bit for the SDA scratch pad to temporarily store this wrap condition before the update can be done.

In brief then, the QBG selection process begins for each new cell tic. Current Time is updated and the various wrap conditions are checked. The QBG_DT values are updated to reflect the current wrap status. Next, the QBGs are checked to determine which are eligible for service. Of those eligible QBGs, the QBG having the minimum SDA is selected for service. Finally, the selected QBG's TDT and SDA values are updated.

Once a QBG has been selected, one of the 16 QBins which make up the selected QBG must be chosen. This is accomplished as follows: If all the QBins of the selected QBG are empty, claim an error. If there are QBins in the Must_Serve region, then select the QBin in the Must_Serve region which has the lowest TDT. If none of the QBins are in the Must_Serve region, then select the QBin in the highest priority group. If more than one QBin is in the highest priority group, then select the QBin with the lowest SDA in that priority group.

To identify whether a QBin should be serviced, two user configurable parameters, QBin_ICG and QBin Priority, and two scratch pad values, QBin_TDT and QBin_SDA, are maintained for each QBin. The QBin_ICG has units of tics per cell and configured the desired minimum rate the QBin will be serviced at. The ICGs are stored in a 13-bit floating point format ($1 \cdot M2^E$, where M is a normalized 8-bit mantissa and E is a 5-bit exponent) in QBin Rate Data Structure 710. QBin Priorities are 4-bit, unitless quantities that rank the priorities of the QBins for each QBG when excess bandwidth is distributed. Each QBin can have a different priority value or multiple QBins can have the same priority value. The smaller the priority value, the higher the priority for receiving excess bandwidth. The QBin Priority values may also be stored in the QBin Rate Data Structure 710. QBin_TDTs have units of tics and are 28-bits wide, including 2-bits to indicate a Current Time wrap status, 18-bits for an integer portion and 8-bits for a fractional portion. QBin_SDAs are 19-bits wide, including 1-bit to keep potential overflow status and an 18-bit integer portion.

Like QBGs, QBins are also serviced according to their respective states, Must_Serve or Ok_to_Serve. To determine whether a QBin is in the Must_Serve state, the QBin_TDT is compared to a QBin Current Time. QBin Current Time (QBinCT) is maintained by hardware timers for each QBG. Two status bits are used to carry wrap around information for the QBinCT and an additional bit is used to identify whether any QBin of a given QBG is in the Ok_to_Serve state. This bit controls whether the QBinCT increments. The QBinCT increments every cell tic if the Ok_to_Serve bit is set. The wrap around bits are cleared when the QBG is selected for service.

QBinCT is used to ensure that a minimum rate for QBin servicing is satisfied before excess bandwidth is distributed. If QBinCT is greater than QBin_TDT, then the QBin is in the Must_Serve state because servicing the QBin later would cause the service rate to fall below the programmed minimum QBin rate (established by the QBin_ICG). Otherwise, the QBin is in the Ok_to_Serve state.

Figure 10:
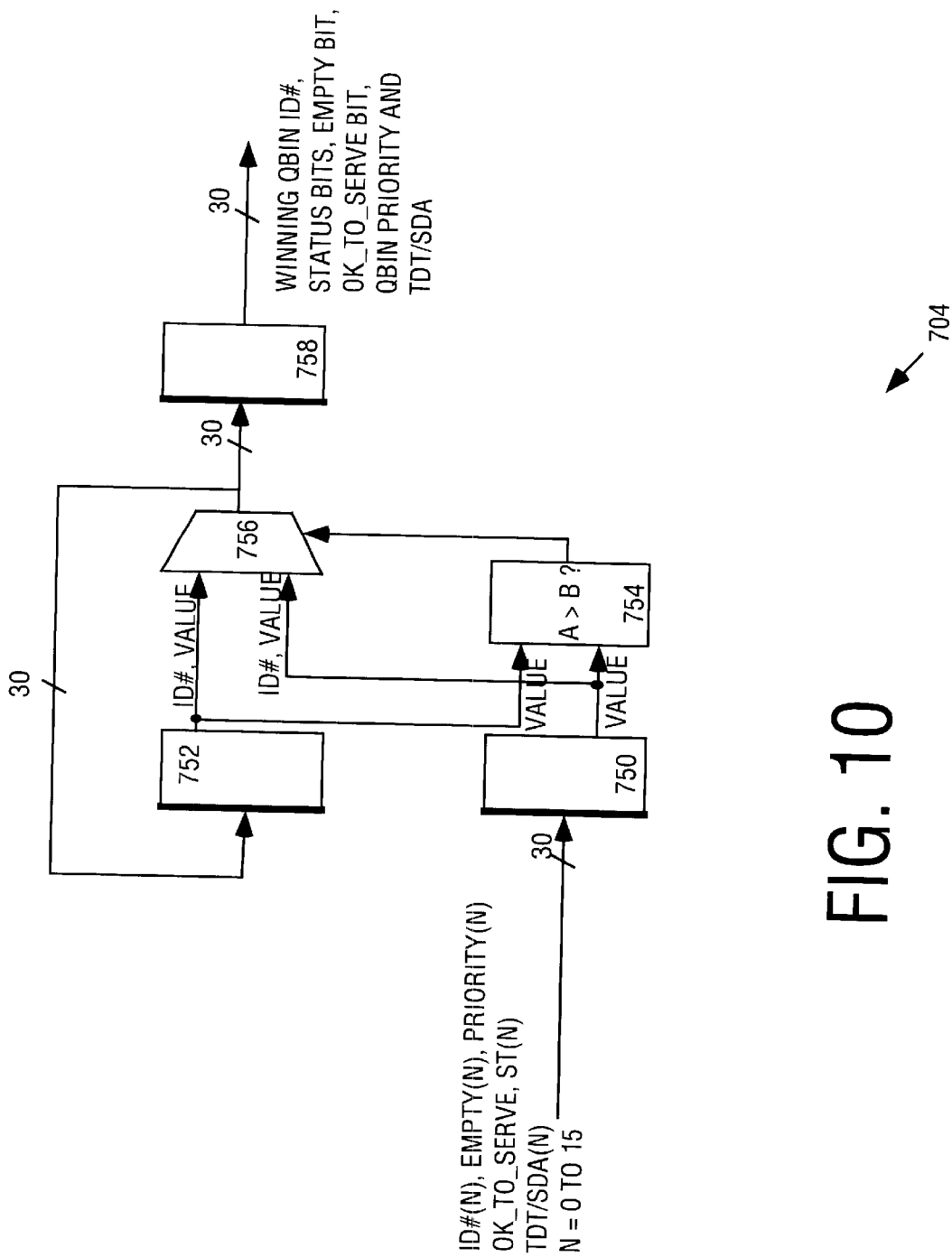
FIG. 10 illustrates logical queue selection logic for use with the queue server of FIG. 7 according to one embodiment of the present invention.

A winning QBin is selected for service using QBin selection logic 704 shown in FIG. 10. QBin selection logic 704 uses "values" for comparison as was the case for QBG selection logic 702. For QBins in the Must_Serve state, the "value" is formed by concatenating the QBin empty bit, two TDT wrap-around status bits and the integer portion of the QBin_TDTs. For QBins in the Ok_to_Serve state, the "value" is formed by concatenating the empty bit, the QBin Priority bits and the SDA. The QBin id# field is 4-bits wide. After 16 clock cycles, a clock enable signed is pulsed and the winning QBin number together with its "value" will be available one clock later. If the winning QBin has its empty bit set, this indicates that all QBins for the selected QBG are empty and no QBins will be serviced.

The selection process is as follows: QBin selection logic 704 reads a QBin id# and "value" into register 750 each clock and compares the currently winning "value" from register 752 with the new "value" in comparator 754. The output of comparator 754 is used as a control signal for mux 756 which selects the QBin with the lowest "value". The currently winning QBin id# and "value" are passed to register 752 for the next comparison. At the conclusion of the comparison process, the winning QBin id# and "value" are latched in register 758 to be passed to queue manager 800.

QBin Server 700 updates the TDT and/or SDA of the selected QBin as follows. In the OK_to Serve region:

new QBin_TDT=QBinCT+QBin_ICG; and new QBin_SDA=old QBin_SDA+QBin_RSD To reduce the amount of memory for storing ICG and RSD values, the QBin_RSD is defined to be the integer portion of the QBin_ICG.

In the Must_Serve region:

New QBin_TDT=old QBin_TDT+QBin_ICG

QBins have the same wrap-around problem between QBinCT and QBin_TDT as QBGs. There are also two status bits to carry the wrap-around relationship between QBinCT and QBin_TDT. The encoding and state transitions are the same as for the QBGs.

To reduce the requirement of updating all 512 QBin state bits when QBinCT wraps, a 2-bit CT wrap counter (ctw) is kept for each QBG. When a QBG is selected for service, its ctw is used to update status bits of all the 16 QBin_TDTs within the QBG. If a QBG is not selected, then its QBin_TDT status bits will not be updated. The ctw is incremented whenever QBin_CT wraps and the ctw has not reached its maximum value. The ctw is cleared after the QBG is selected for service.

When status bits, priority bits, and the integer portion of TDT are read out sequentially from memory for comparison, status bits are updated based on the ctw value before being sent to QBin selection logic 704. Status bits state transitions for those QBins within the selected QBG may be recited as follows:

while (ctw !=0)
    begin;
    case (status bits);
        11: status_bits<-10;
        10: status_bits<-01;
        01: status_bits<-00;
        00: status_bits<-00;
    ctw<-ctw−1;
    end;

The QBin_SDA can overflow when a new SDA is calculated. One overflow bit is included to identify the overflow condition as was the case for the QBG_SDAs. When a QBin is selected for service, and that QBin is in the Ok_to_Serve state, the SDA of the winning QBin is subtracted from all of the other QBin_SDAs in the same QBin priority. If the results are negative, then the difference is forced to saturate at zero. This update prevents the SDA from getting too large and requiring more than one overflow bit.

Note that only the QBins with the same priority are updated, and only if the winning QBin is in the OK_to_Serve region. Otherwise, the QBin_SDA values are left unchanged.

When a QBin is inactive for a while because it is empty, its TDT will fall behind the Current Time. In order for the QBin to not accumulate service credit, its TDT is adjusted to Current Time when the TDT begins to lag behind the Current Time. Since a QBG will never be serviced unless one QBin in that QBG is non-empty, there may be one QBin whose TDT will never be adjusted to Current Time when the QBG has gone empty. To work around this problem, QBin Server 700 keeps QBG empty sticky bits for each of the 32 QBGs. The sticky bits indicate whether the QBG has gone empty since the last time the QBG was selected for service.

QBin Server 700 uses the QBG empty sticky bit, and the current QBin empty indication to decide whether to update each QBin when the QBG is selected:

new TDT=MAX (old TDT, Current Time)

Note that if the QBG empty sticky bit is asserted, all QBin_TDTs in the QBG are adjusted when the QBG is selected for service. If the QBG empty sticky bit is de-asserted, then only the empty QBin_TDTs in that QBG are adjusted. This updated is performed at the beginning of the QBin selection process. After the update, the QBG empty sticky bit is cleared.

If a QBG cannot satisfy the minimum rates of all of the active QBins belonging to that QBG, then the QBin_TDT values will fall behind the QBinCT. This causes the QBins to accumulate service credit. When the QBG does get enough bandwidth to satisfy the minimum rates of the QBins, it may take several thousands of QBin services before any excess bandwidth is available. This effect has the appearance of a service time lag and can cause QBins to burst out cells when the bandwidth becomes available. To avoid this bursty effect, QBin Server 700 keeps an indication of whether all QBins in a QBG are in the Must_Serve state. If so, then the QBinCT does not increment at the cell tic. If the QBinCT were incremented, then this would cause all QBins to fall behind QBinCT even more, thereby accumulating service credit. By inhibiting the incrementing of QBinCT, QBin Server 700 implies that the minimum rates of all QBins cannot be satisfied. By stopping Current Time, all QBin rates appear to decrease proportionately until the minimum rates can be satisfied.

The calculation of QBin bandwidth allocation is the same as QBG bandwidth allocation. The QBin_ICG determines the QBin minimum rate. Once all QBins in the QBG satisfy their minimum rate, the excess bandwidth is shared proportionately among the active QBins, giving priority to QBins in the higher priority group. The RSD values determine the sharing of the excess bandwidth only, and have no effect when the QBins have not met their minimum rate requirement.

The difference in the QBin bandwidth calculation verses the QBG bandwidth calculation is in the summation of the RSD values. For QBins, the excess bandwidth is shared based on the RSD value of the selected QBin, and the RSD values of the other active QBins in the selected QBin's priority group. QBins in other priority groups do not affect the bandwidth allocation in the current QBin priority group.

In brief then, a new QBin selection takes place when a new cell tic is received. At that time, Current Time is updated and the wrap status of the above values are checked. Next, the QBin_TDT status bits are updated to reflect the wrap status and the QBin with the minimum TDT/SDA is selected for service. The TDT/SDA values are updated and the QBin selection logic 704 then awaits the selection of a next QBG for service.

Thus a multi-stage queuing discipline has been described. Although certain preferred embodiments have been discussed and illustrated, it should be appreciated that these discussions and illustrations are exemplary only. Accordingly, the present invention should be measured only in terms of the claims which follows.

What is claimed is:

1. A method of servicing cells within a node of a cell switching network comprising:

selecting one of a plurality of groups of logical queues for service, each group of logical queues containing a number of logical queues of cells to be transported within a cell switching network, such selection being made by examining the groups of logical queues in turn and for each group of logical queues under consideration determining whether or not (i) that group has cells available for service, (ii) that group is in a serve or no-serve state, and (iii) that group has an associated output queue with space available to accept cells, and such selection resulting is a selected group of logical cells for service; and selecting from among the logical queues comprising the selected group of logical queues one of said logical queues for service.

2. The method of claim 1 wherein selecting one of a plurality of groups of logical queues for service comprises examining said plurality of groups of logical queues to find a group of logical queues which is most overdue for service.

3. The method of claim 2 wherein selecting from among the logical queues further comprises selecting a logical queue from said logical queues comprising said selected group of logical queues according to a state of said logical queue.

4. The method of claim 3 wherein said state of said logical queue is determined by comparing a current time with a theoretical departure time for logical queue.

5. A method of allocating bandwidth among a plurality of connections within a cell switched digital network, comprising:

selecting a first group of a plurality of groups of logical queues each having an assigned one of said connections for servicing, such selection being made by examining the groups of logical queues and for each group of logical queues under consideration determining whether or not (i) that group has cells available for service, (ii) that group is in a serve or no-serve state, and (iii) that group has an associated output queue with space available to accept cells; and selecting a first of said logical queues associated with said first group for servicing.

6. The method of claim 5 wherein each of said logical queues corresponds to a class of service within said digital network, each class of service having an associated service rate.

7. The method of claim 6 wherein determining whether or not the group of logical queues under consideration is in a serve or no-serve state comprises:

computing a minimum theoretical departure time for said group, the minimum theoretical departure time representing a time at which that group of logical queues may be serviced according to user defined service criteria for said digital network; and determining whether said group of logical queues under consideration is eligible for servicing according to its computed minimum theoretical departure time.

8. The method of claim 7 wherein determining whether said group of logical queues under consideration is eligible for servicing further comprises determining said eligibility according to service delay accumulator values associated with said group of logical queues under consideration.

9. The method of claim 8 further comprising updating said minimum theoretical departure time for said group of logical queues under consideration.

10. The method of claim 7 wherein selecting a first of said logical queues comprises:

determining a state of each of said logical queues associated with said first group according to theoretical departure times associated with each of said logical queues; and selecting said first logical queue according to its state.

11. The method of claim 10 wherein selecting said first logical queue according to its state further comprises selecting said first logical queue according to its theoretical departure time if said first logical queue is in a first state, otherwise selecting said first logical queue according to an associated service delay accumulator value if said first logical queue is in a second state.

12. The method of claim 11 wherein selecting said first logical queue according to an associated service delay accumulator further comprises selecting said first logical queue according to an associated priority if more than one of said logical queues of said selected group are in said second state.

13. A digital switch, comprising:

a plurality of logical queues of cells stored in a memory, each logical queue having an associated service priority, said logical queues being arranged in a number of groups; and selection logic coupled to said memory and configured to select a first of said groups by examining the groups of logical queues and for each group of logical queues under consideration determining whether or not (i) that group has cells available for service, (ii) that group is in a serve or no-serve state, and (iii) that group has an associated output queue with space available to accept cells and further configured to select one of said logical queues associated with said first of said groups for servicing.

14. A digital switch as in claim 13, wherein said selection logic comprises:

group selection logic configured to select said first group; and logical queue selection logic coupled to said group selection logic and configured to select said one logical queue according to rate data associated with each of said logical queues associated with said first group.

15. A digital switch as in claim 14, wherein said group selection logic comprises one or more sets of group comparison logic, said group comparison logic configured to accept group comparison values associated with each of said groups and to identify a minimum group comparison value of said group comparison values, said minimum group comparison value being associated with said first group, said group comparison values being derived from rate data associated with each of said groups.

16. A digital switch as in claim 15, wherein each of said sets of group comparison logic comprises:

an input register coupled to receive and latch one of said group comparison values;

a feedback register coupled to receive and latch a currently minimum group comparison value;

a comparator coupled to said input register and to said feedback register and configured to produce a control signal, said control signal indicating a winning group comparison value which identifies a lower of said group comparison value latched in said input register and said currently minimum group comparison value; and a multiplexer coupled to said input register, said feedback register and said comparator, said multiplexer configured to receive said control signal and to provide said winning group comparison value to said feedback register as a new minimum group comparison value in response thereto.

17. A digital switch as in claim 16 wherein said logical queue selection logic comprises one or more sets of QBin comparison logic, said QBin comparison logic configured to accept logical queue comparison values associated with each of said logical queues of said first group and to identify a minimum logical queue comparison value of said logical queue comparison values, said minimum logical queue comparison value being associated with said one logical queue, said logical queue comparison values being derived from said rate data associated with each of said logical queues of said first group.

18. A digital switch as in claim 17, wherein each of said sets of QBin comparison logic comprises:
  an input register coupled to receive and latch one of said logical queue comparison values;
  a feedback register coupled to receive and latch a currently minimum logical queue comparison value;
  a comparator coupled to said input register and to said feedback register and configured to produce a control signal, said control signal indicating a winning logical queue comparison value which identifies a lower of said logical queue comparison value latched in said input register and said currently minimum logical queue comparison value; and
  a multiplexer coupled to said input register, said feedback register and said comparator, said multiplexer configured to receive said control signal and to provide said winning logical queue comparison value to said feedback register as a new minimum logical queue comparison value in response thereto.

19. A digital switch as in claim 15 wherein said logical queue selection logic comprises one or more sets of QBin comparison logic, said QBin comparison logic configured to accept logical queue comparison values associated with each of said logical queues of said first group and to identify a minimum logical queue comparison value of said logical queue comparison values, said minimum logical queue comparison value being associated with said one logical queue, said logical queue comparison values being derived from said rate data associated with each of said logical queues of said first group.

20. A digital switch as in claim 19, wherein each of said sets of QBin comparison logic comprises:
  an input register coupled to receive and latch one of said logical queue comparison values;
  a feedback register coupled to receive and latch a currently minimum logical queue comparison value;
  a comparator coupled to said input register and to said feedback register and configured to produce a control signal, said control signal indicating a winning logical queue comparison value which identifies a lower of said logical queue comparison value latched in said input register and said currently minimum logical queue comparison value; and
  a multiplexer coupled to said input register, said feedback register and said comparator, said multiplexer configured to receive said control signal and to provide said winning logical queue comparison value to said feedback register as a new minimum logical queue comparison value in response thereto.

21. A virtual interface, comprising a set of logical queues corresponding to a plurality of classes of service and a scheduler configured to select one of said logical queues for service, such selection being made by examining groups of said logical queues and for each group of logical queues under consideration determining whether or not (i) that group has cells available for service, (ii) that group is in a server or no-server state, and (ii) that group has an associated output queue with space available to accept calls.

22. A virtual interface as in claim 21 wherein said scheduler is further configured to select one of said logical queues for service according to a transmission requirement for a class of service associated with said selected logical queue.

23. A virtual interface as in claim 21 further configured to limit a number of cells to be stored in a memory associated with said virtual interface according to one or more thresholds.

24. A virtual interface as in claim 23 wherein said thresholds include a cell maximum for said virtual interface.

25. Computer-readable instructions, which when executed by components of a node of a cell switching network, cause the node to be configured for servicing cells within a cell switching network according to a process that comprises:
  selecting one of a plurality of groups of logical queues for service, each group of logical queues containing a number of logical queues of cells to be transported within a cell switching network, such selection being made by examining the groups of logical queues in turn and for each group of logical queues under consideration determining whether or not (i) that group has cells available for service, (ii) that group is in a serve or no-serve state, and (iii) that group has an associated output queue with space available to accept cells, and such selection resulting is a selected group of logical cells for service; and
  selecting from among the logical queues comprising the selected group of logical queues one of said logical queues for service.

26. The instructions of claim 25 wherein according to the process selecting one of a plurality of groups of logical queues for service comprises examining said plurality of groups of logical queues to find a group of logical queues which is most overdue for service.

27. The instructions of claim 26 wherein according to the process selecting from among the logical queues further comprises selecting a logical queue from said logical queues comprising said selected group of logical queues according to a state of said logical queue.

28. The instructions of claim 27 wherein according to the process said state of said logical queue is determined by comparing a current time with a theoretical departure time for logical queue.

29. Computer-readable instructions, which when executed by components of a node of a cell switching network, cause the node to be configured for allocating bandwidth among a plurality of connections within a cell switched digital network according to a process that comprises:
  selecting a first group of a plurality of groups of logical queues each having an assigned one of said connections for servicing, such selection being made by examining the groups of logical queues and for each group of logical queues under consideration determining whether or not (i) that group has cells available for service, (ii) that group is in a serve or no-serve state, and (iii) that group has an associated output queue with space available to accept cells; and
  selecting a first of said logical queues associated with said first group for servicing.

30. The instructions of claim 29 wherein according to the process each of said logical queues corresponds to a class of service within said digital network, each class of service having an associated service rate.

31. The instructions of claim 30 wherein according to the process determining whether or not the group of logical queues under consideration is in a serve or no-serve state comprises:

computing a minimum theoretical departure time for said group, the minimum theoretical departure time representing a time at which that group of logical queues may be serviced according to user defined service criteria for said digital network; and determining whether said group of logical queues under consideration is eligible for servicing according to its computed minimum theoretical departure time.

32. The instructions of claim 31 wherein according to the process determining whether said group of logical queues under consideration is eligible for servicing further comprises determining said eligibility according to service delay accumulator values associated with said group of logical queues under consideration.

33. The instructions of claim 32 wherein the process further comprises updating said minimum theoretical departure time for said group of logical queues under consideration.

34. The instructions of claim 31 wherein according to the process selecting a first of said logical queues comprises:

determining a state of each of said logical queues associated with said first group according to theoretical departure times associated with each of said logical queues; and selecting said first logical queue according to its state.

35. The instructions of claim 34 wherein according to the process selecting said first logical queue according to its state further comprises selecting said first logical queue according to its theoretical departure time if said first logical queue is in a first state, otherwise selecting said first logical queue according to an associated service delay accumulator value if said first logical queue is in a second state.

36. The instructions of claim 35 wherein according to the process selecting said first logical queue according to an associated service delay accumulator further comprises selecting said first logical queue according to an associated priority if more than one of said logical queues of said selected group are in said second state.

37. A digital switch, comprising:

a plurality of logical queues of cells stored in storage means, each logical queue having an associated service priority, said logical queues being arranged in a number of groups; and selection means coupled to said storage means and configured to select a first of said groups by examining the groups of logical queues and for each group of logical queues under consideration determining whether or not (i) that group has cells available for service, (ii) that group is in a serve or no-serve state, and (iii) that group has an associated output queue with space available to accept cells and further configured to select one of said logical queues associated with said first of said groups for servicing.

38. A digital switch as in claim 37, wherein said selection means comprise:

group selection means configured to select said first group; and logical queue selection means coupled to said group selection means and configured to select said one logical queue according to rate data associated with each of said logical queues associated with said first group.

39. A digital switch as in claim 38, wherein said group selection means comprise one or more sets of group comparison means, said group comparison means configured to accept group comparison values associated with each of said groups and to identify a minimum group comparison value of said group comparison values, said minimum group comparison value being associated with said first group, said group comparison values being derived from rate data associated with each of said groups.

40. A digital switch as in claim 39, wherein each of said sets of group comparison means comprise:

first input means coupled to receive and latch one of said group comparison values;

first feedback means coupled to receive and latch a currently minimum group comparison value;

first comparison means coupled to said first input means and to said first feedback means and configured to produce a control signal, said control signal indicating a winning group comparison value which identifies a lower of said group comparison value latched in said first input means and said currently minimum group comparison value; and first multiplexing means coupled to said first input means, said first feedback means and said first comparison means, said first multiplexing means configured to receive said control signal and to provide said winning group comparison value to said first feedback means as a new minimum group comparison value in response thereto.

41. A digital switch as in claim 40 wherein said logical queue selection means comprise one or more sets of QBin comparison means, said QBin comparison means configured to accept logical queue comparison values associated with each of said logical queues of said first group and to identify a minimum logical queue comparison value of said logical queue comparison values, said minimum logical queue comparison value being associated with said one logical queue, said logical queue comparison values being derived from said rate data associated with each of said logical queues of said first group.

42. A digital switch as in claim 41, wherein each of said sets of QBin comparison means comprise:

second input means coupled to receive and latch one of said logical queue comparison values;

second feedback means coupled to receive and latch a currently minimum logical queue comparison value;

second comparison means coupled to said second input means and to said second feedback means and configured to produce a control signal, said control signal indicating a winning logical queue comparison value which identifies a lower of said logical queue comparison value latched in said second input means and said currently minimum logical queue comparison value; and second multiplexing means coupled to said second input, said second feedback means and said second comparison means, said second multiplexing means configured to receive said control signal and to provide said winning logical queue comparison value to said second feedback means as a new minimum logical queue comparison value in response thereto.

43. A digital switch as in claim 39 wherein said logical queue selection means comprise one or more sets of QBin comparison means, said QBin comparison means configured to accept logical queue comparison values associated with each of said logical queues of said first group and to identify a minimum logical queue comparison value of said logical queue comparison values, said minimum logical queue comparison value being associated with said one logical queue, said logical queue comparison values being derived from said rate data associated with each of said logical queues of said first group.

44. A digital switch as in claim 43, wherein each of said sets of QBin comparison logic comprises:

third input means coupled to receive and latch one of said logical queue comparison values;

third feedback means coupled to receive and latch a currently minimum logical queue comparison value;

third comparison means coupled to said third input means and to said third feedback means and configured to produce a control signal, said control signal indicating a winning logical queue comparison value which identifies a lower of said logical queue comparison value latched in said third input means and said currently minimum logical queue comparison value; and third multiplexing means coupled to said third input means, said third feedback means and said third comparison means, said third multiplexing means configured to receive said control signal and to provide said winning logical queue comparison value to said third feedback means as a new minimum logical queue comparison value in response thereto.

45. A virtual interface, comprising a set of logical queues corresponding to a plurality of classes of service and scheduling means configured to select one of said logical queues for service, such selection being made by examining groups of said logical queues and for each group of logical queues under consideration determining whether or not (i) that group has cells available for service, (ii) that group is in a serve or no-serve state, and (iii) that group has an associated output queue with space available to accept cells.

46. A virtual interface as in claim 45 wherein said scheduling means is further configured to select one of said logical queues for service according to a transmission requirement for a class of service associated with said selected logical queue.

47. A virtual interface as in claim 45 further configured to limit a number of cells to be stored in a memory associated with said virtual interface according to one or more thresholds.

48. A virtual interface as in claim 47 wherein said thresholds include a cell maximum for said virtual interface.

* * * * *